United States Patent [19]
Deaver et al.

[11] Patent Number: 5,901,192
[45] Date of Patent: May 4, 1999

[54] CORE SPRAY LINE RISER APPARATUS AND METHODS

[75] Inventors: Gerald Alan Deaver; Barry Hal Koepke, both of San Jose, Calif.

[73] Assignee: General Electric Company, Schenectady, N.Y.

[21] Appl. No.: 08/943,895

[22] Filed: Oct. 3, 1997

[51] Int. Cl.$^6$ ........................................... G21C 9/00
[52] U.S. Cl. .................. 376/282; 376/286; 376/463
[58] Field of Search ........................... 376/282, 286, 376/463; 285/15, 185, 191, 133.11, 133.21, 133.5, 133.6; 138/97–99

[56] References Cited

U.S. PATENT DOCUMENTS

| | | | |
|---|---|---|---|
| 4,859,403 | 8/1989 | Dixon et al. | 376/286 |
| 5,735,551 | 4/1998 | Whitman et al. | 285/15 |
| 5,737,380 | 4/1998 | Deaver et al. | 376/282 X |
| 5,743,569 | 4/1998 | Deters et al. | 285/133.11 X |

*Primary Examiner*—Charles T. Jordan
*Assistant Examiner*—Matthew J. Lattig
*Attorney, Agent, or Firm*—Armstrong Teasdale LLP

[57] ABSTRACT

Core spray line riser repair apparatus and methods for axially restraining a reactor core spray line riser to a T-box are described. In one embodiment, the repair apparatus includes a sleeve, a threaded draw bolt extending through the axial bore, and a threaded block. The sleeve includes a substantially cylindrical main body having an axial bore extending therethrough and a flange at one end of the main body. The sleeve is configured to be inserted into the T-box until the flange abuts against the T-box. The draw bolt is configured to extend through the sleeve flange, the sleeve bore, and an opening in the core spray line riser. The draw bolt engages the block to draw the block in tight engagement with the core spray line riser.

20 Claims, 3 Drawing Sheets

CORE SPRAY LINE RISER APPARATUS AND METHODS

FIELD OF THE INVENTION

This invention relates generally to nuclear reactors and, more particularly, to an apparatus and methods for securing piping within reactor pressure vessels of such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spray spargers inside the RPV. The core spray piping and spargers deliver water flow to the reactor core.

Stress corrosion cracking (SCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as T-boxes and core spray line risers, occasionally require replacement as a result of SCC. Replacing the core spray piping often requires removing and replacing the core spray line riser. The core spray line attachment to the shroud, however, typically is installed during original reactor construction and is difficult to access. In addition, replacing the core spray line riser, particularly the attachment to the shroud, is complicated by the limited available working space.

The core spray line riser includes a lower elbow secured to a core spray sparger T-box. There are a number of welds between the lower elbow and T-box, and the integrity of these welds must be maintained to ensure proper operation of the core spray piping. As explained above, it is difficult to access these welds.

It would be desirable to provide an apparatus which facilitates providing additional support for the welds between the core spray sparger T-box and the lower weld of the lower elbow of the core spray line riser. It would also be desirable to provide such apparatus which is easy to assemble and install in a limited working space.

SUMMARY OF THE INVENTION

These and other objects may be attained by an apparatus which, in one embodiment, includes a sleeve sized to be partially inserted within a T-box pipe, and a draw bolt which extends through the sleeve and engages a block so that the draw bolt draws the block into tight engagement with the lower elbow of the riser. More particularly, the sleeve is substantially cylindrically shaped and has a main cylindrical body and a flange at one end. An axial bore extends through the main body, and two opposing water flow openings are located in the sleeve main body. The main body is sized to be inserted into the T-box pipe so that the sleeve flange engages one end of the T-box pipe. The sleeve flange includes an opening sized to receive the draw bolt. The draw bolt is threaded and is of sufficient length to extend through the main body bore and an opening machined in the core spray line riser lower elbow. The block is substantially wedge shaped and includes a threaded opening to engage the draw bolt.

To install the repair apparatus, after removing a core spray line riser, a replacement core spray line riser is coupled to the T-box, for example by welding the lower elbow to the core spray sparger T-box. The T-box end plate is then removed and the repair apparatus sleeve is inserted into the open end of the T-box so that the sleeve flange is in contact with and closes off the open end of the T-box. The sleeve is rotated to ensure that the water flow openings are substantially aligned with the core spray spargers attached to the T-box. The core spray line repair apparatus draw bolt is then inserted through the sleeve flange opening, through the main body bore, and through the opening machined in the replacement riser lower elbow. The repair apparatus block is then engaged to the draw bolt. The draw bolt is then torqued and locked in place. As the bolt is tightened into engagement with the block, the apparatus provides axial restraint.

The above-described apparatus provides support for the welds between the core spray sparger T-box and the lower weld of the core spray line riser lower elbow. In addition, such apparatus is easy to assemble and can be installed in a limited work space.

DETAILED DESCRIPTION

Figure 1:
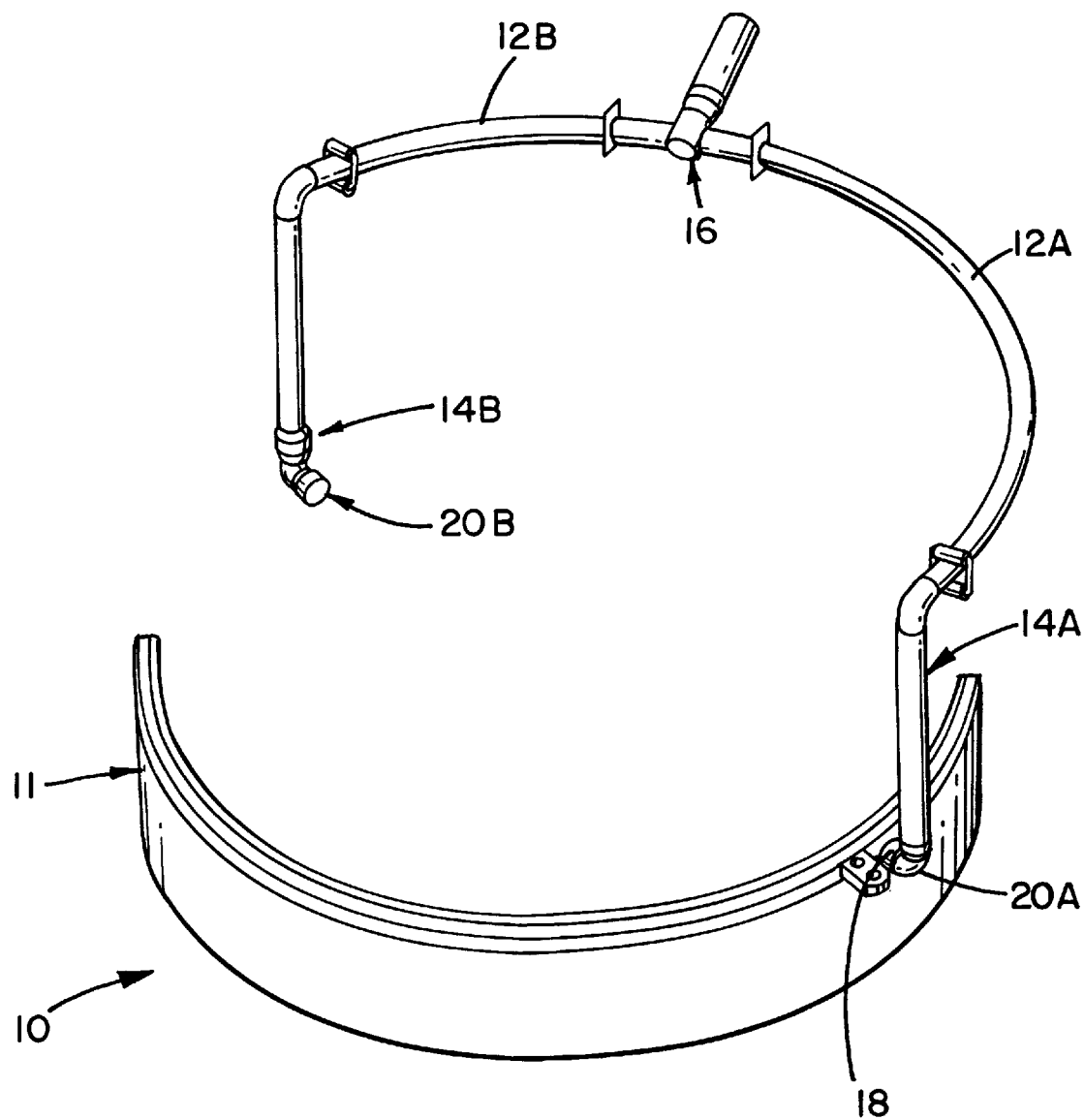
FIG. 1 is a perspective view with parts cutaway of a reactor pressure vessel including a core spray line riser.

FIG. 1 is a perspective view with parts cut away of a reactor pressure vessel (RPV) 10. RPV 10 includes a shroud 11, core spray lateral pipes 12A and 12B, core spray line risers 14A and 14B, a T-box junction 16, a T-box 18, and core spray spargers (not shown in FIG. 1). Core spray line risers 14A and 14B each include a lower elbow 20A and 20B. Elbows 20A and 20B each include an opening (not shown). Core spray line riser 14A is configured to couple core spray pipe 12A and T-box 18.

Figure 2:
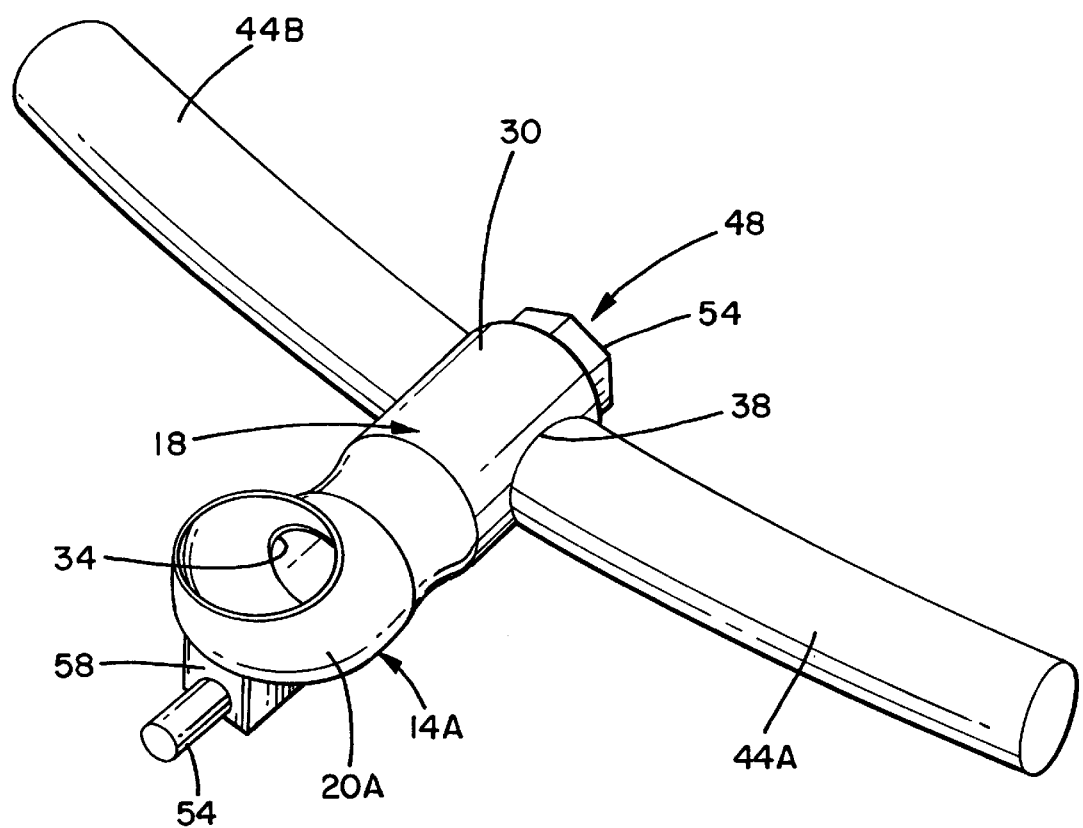
FIG. 2 is a perspective view of a portion of a core spray line and core spray line repair apparatus in accordance with one embodiment of the present invention.

Referring to FIG. 2, T-box 18 includes a substantially cylindrical pipe 30 having a bore 34 extending therethrough, two core spray sparger openings 38 (only one shown), and an end plate (which has been machined off in the FIG. 2 illustration). Core spray line lower elbow 20A is secured to T-box 18, typically with a lower weld (not shown). Core spray line riser 14A may, for example, be secured to T-box 18 in various manners, including, inserting pipe 30 into elbow 20A and welding, or inserting elbow 20A into pipe 30 and welding, as well as abutting elbow 20A to pipe 30 and welding. Core spray spargers 44A and 44B are coupled to T-box openings 38, for example by welding.

Figure 3:
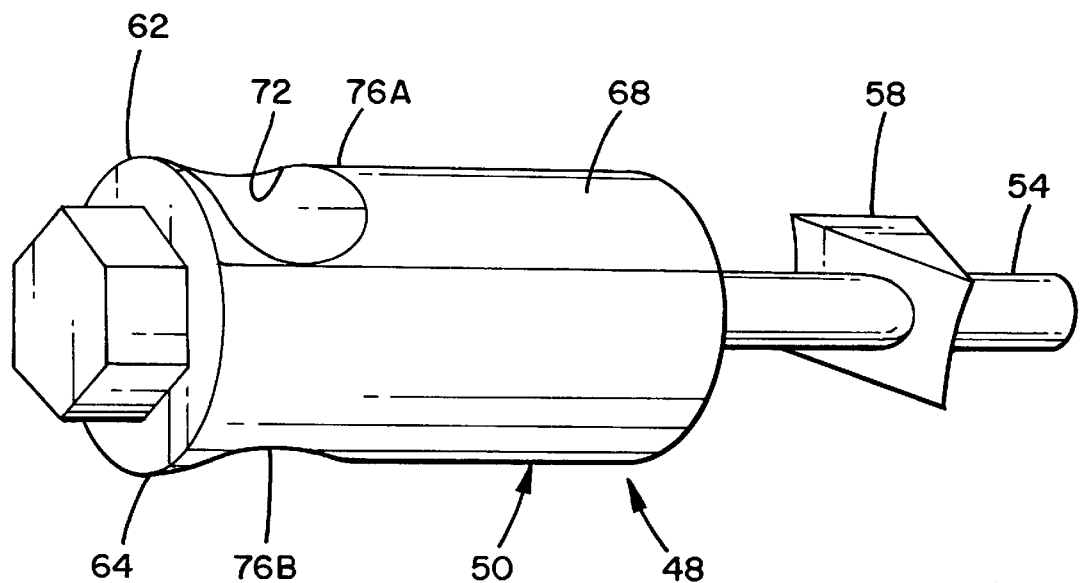
FIG. 3 is a perspective view of a core spray line repair apparatus shown in FIG. 2 prior to installation.

Referring to FIGS. 2 and 3, repair apparatus 48 includes a substantially cylindrical sleeve 50, a draw bolt 54, and a block 58. Cylindrical sleeve 50 includes a flange 62 at one end 64, and a main cylinder body 68 having an axial bore 72 extending therethrough. Opposing water flow openings 76A and 76B are located in sleeve main body 68. Main body 68 is sized to be inserted within T-box pipe 30 so that sleeve flange 62 engages T-box 18. Flange 62 outer diameter is greater than the outer diameter of T-box pipe 30 and includes an opening (not shown) sized to receive draw bolt 54. Flange 62, may for example, be integral or welded to main body 68. Water flow openings 76A and 76B are configured to provide a fluid passage from core spray spargers 44A and 44B to T-box 18. Draw bolt 54 is of sufficient length to extend through flange opening, main body bore 72, elbow opening (not shown), and block 58. Draw bolt 54 is threaded and configured to engage block 58. Block 58 includes a threaded opening (not shown) and is configured to threadedly engage bolt 54 to draw block 58 into tight engagement with riser lower elbow 20A or 20B.

Sleeve 50 may, for example, be fabricated from type 304L or 316L stainless steel. Bolt 54 and block 58 may be fabricated from type XM-19 stainless steel.

After replacing core spray riser 14A, repair apparatus 48 is coupled between T-box 18 and core spray line riser 14A. Specifically, in one embodiment, core spray line riser elbow 20A is coupled to T-box 18, for example with a weld. T-box end plate (not shown) is removed, for example by machining. Main cylindrical body 68 is inserted into T-box pipe 30 until flange 62 fully engages T-box 18. Draw bolt 54 is inserted through flange opening, main body bore 72, and core spray line riser elbow opening. Block 58 is engaged to draw bolt 54 and engaged with lower elbow 20A. Sleeve 50 is rotated to ensure that sleeve water flow openings 76A and 76B are substantially aligned with core spray spargers 44A and 44B attached to T-box 18. An opening (not shown) in lower elbow 20A corresponds to a centerline of sleeve 50. The lower elbow opening is formed, for example, by machining or drilling. Draw bolt 54 is inserted through flange opening, bore 72, and elbow opening. Bolt 54 is then engaged to block 58. Draw bolt 54 is torqued until block 58 fully engages lower elbow 20A and locked into place. The resulting connection provides a fluid passage from T-box junction 16 to core spray spargers 44A and 44B.

Repair apparatus 48 provides axial restraint for core spray line riser 14A and T-box 18 connection. Additionally, because draw bolt 54 is positioned within T-box bore 34, draw bolt 54 is exposed to the injection waters temperature only and would, therefore, be expected to contract at the same rate or slightly less than core spray riser 14A and 14B and T-box 22, which facilitates minimizing leakage.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A core spray line riser repair apparatus for securing a core spray line riser to a T-box in a nuclear reactor, said repair apparatus comprising a substantially cylindrical sleeve comprising a flange, a main cylindrical body having an axial bore extending therethrough, and at least one water flow opening therein.

2. A core spray line riser repair apparatus in accordance with claim 1 further comprising a draw bolt configured to extend through said sleeve bore.

3. A core spray line riser repair apparatus in accordance with claim 2 wherein said draw bolt is threaded.

4. A core spray line riser repair apparatus in accordance with claim 2 further comprising a block configured to engage said draw bolt to couple said apparatus to the core spray line riser.

5. A core spray line riser repair apparatus in accordance with claim 4 wherein said block has a threaded opening extending therethrough.

6. A core spray line riser repair apparatus in accordance with claim 1 wherein said sleeve comprises two opposed water flow openings.

7. A core spray line riser repair apparatus in accordance with claim 1 wherein said sleeve flange is located at one end of said main body and is integral therewith.

8. A core spray line riser repair apparatus in accordance with claim 1 wherein said flange is welded to said main body.

9. A method of securing a core spray line riser to a T-box utilizing a core spray line riser repair apparatus, the repair apparatus including a sleeve having a cylindrical main body, said method comprising the steps of:

inserting the sleeve main body into the T-box; and coupling the repair apparatus to the core spray line riser.

10. A method in accordance with claim 9 wherein the T-box has an end plate, and wherein inserting the sleeve main body into the T-box comprises the step of removing the end plate.

11. A method in accordance with claim 9 wherein the sleeve main body has at least one water flow opening and the T-box has at least one core spray sparger, and wherein coupling the repair apparatus to the core spray line riser comprises substantially aligning the water flow openings and the core spray spargers.

12. A method in accordance with claim 9 wherein coupling the repair apparatus to the core spray line riser comprises the step of forming an opening in the core spray line riser.

13. A method in accordance with claim 12 wherein the sleeve main body has an axial bore extending therethrough and the apparatus further includes a draw bolt extending through the bore, and wherein coupling the repair apparatus to the core spray line riser further comprises the step of extending the draw bolt through the opening.

14. A method in accordance with claim 13 wherein the repair apparatus includes a block, and wherein coupling the repair apparatus to the core spray line riser further comprises the step of engaging the draw bolt to the block.

15. A method in accordance with claim 14 wherein the repair apparatus block has an opening and the draw bolt and block opening are threaded, and wherein coupling the repair apparatus to the core spray line riser further comprises the step of threadedly engaging the draw bolt to the block.

16. A method in accordance with claim 12 wherein the opening is parallel to the axial bore centerline.

17. A core spray line riser assembly for a reactor pressure vessel of a nuclear reactor, said core spray line riser assembly comprising:

a T-box having an axial bore extending therethrough and at least one core spray sparger opening;

a core spray sparger coupled to said T-box sparger opening;

a core spray line riser; and a core spray line riser repair apparatus comprising a sleeve having a bore, a block having an opening, and a draw bolt extending through said sleeve bore and said block to secure said core spray line riser to said T-box.

18. A core spray line assembly in accordance with claim 17 wherein said repair apparatus is configured to extend at least partially through said T-box bore.

19. A core spray line assembly in accordance with claim 17 wherein said core spray line riser comprises an opening, and wherein said draw bolt is configured to extend through said riser opening.

20. A core spray line assembly in accordance with claim 17 wherein said core spray line riser comprises an elbow having an opening, and wherein said draw bolt is configured to extend through said elbow opening.

* * * * *